(12) United States Patent
Luo

(10) Patent No.: US 8,696,144 B2
(45) Date of Patent: Apr. 15, 2014

(54) MONITOR VISOR

(75) Inventor: Jin Luo, Shenzhen (CN)

(73) Assignee: Shenzhen PCHOOD Technology Co., Ltd., Shenzhen (CN)

( * ) Notice: Subject to any disclaimer, the term of this patent is extended or adjusted under 35 U.S.C. 154(b) by 446 days.

(21) Appl. No.: 12/735,227

(22) PCT Filed: Dec. 22, 2008

(86) PCT No.: PCT/CN2008/073639
§ 371 (c)(1),
(2), (4) Date: Jun. 22, 2010

(87) PCT Pub. No.: WO2009/082949
PCT Pub. Date: Jul. 9, 2009

(65) Prior Publication Data
US 2010/0290122 A1   Nov. 18, 2010

(30) Foreign Application Priority Data
Dec. 21, 2007   (CN) .......................... 2007 1 0125196

(51) Int. Cl.
*G02B 23/16* (2006.01)
*G02B 27/00* (2006.01)
*G02B 5/02* (2006.01)
*G06F 1/16* (2006.01)
*H04N 5/65* (2006.01)

(52) U.S. Cl.
CPC ............ *G02B 5/0278* (2013.01); *G06F 1/1616* (2013.01); *H04N 5/65* (2013.01)
USPC ............................ 359/601; 359/609; 359/612

(58) Field of Classification Search
USPC ......................................... 359/601–612, 511
See application file for complete search history.

(56) References Cited

U.S. PATENT DOCUMENTS

| | | | | |
|---|---|---|---|---|
| 3,062,917 A * | 11/1962 | Rose | ............................. | 348/842 |
| 5,121,253 A * | 6/1992 | Waintroob | .................... | 359/601 |
| 5,218,474 A * | 6/1993 | Kirschner | .................... | 359/601 |
| 5,528,424 A * | 6/1996 | Lentz et al. | .................... | 359/612 |
| 5,818,635 A * | 10/1998 | Hohn et al. | .................... | 359/612 |
| D411,753 S * | 6/1999 | Jobin | ............................. | D99/43 |
| 7,304,839 B1 * | 12/2007 | Burns | ...................... | 361/679.55 |
| 2005/0063145 A1 * | 3/2005 | Homer et al. | ................. | 361/683 |
| 2006/0279916 A1 * | 12/2006 | Boudreau | .................... | 361/681 |

\* cited by examiner

*Primary Examiner* — Thong Nguyen
(74) *Attorney, Agent, or Firm* — Raymond Y. Chan; David and Raymond patent Firm

(57) ABSTRACT

A monitor visor includes a top component and two side components respectively formed at two sides of the top component, wherein the top and side components are formed in a sheet-like configuration and are orderly connected to form a visor body having a visor cavity with a bottom opening. The sizes of top and side closing walls of the visor cavity match with the sizes of the top and side edges of the monitor respectively. A connecting component is provided between the top component and the side component to join the top component and the side component together. The contour of the inner side of the connecting component matches the shape of the vertex angle of the monitor. The visor is able to match the monitor screen with a circular or another shape of its vertex angle. The visor is easily disassembled, packaged and transported in a convenient manner.

9 Claims, 4 Drawing Sheets

MONITOR VISOR

BACKGROUND OF THE PRESENT INVENTION

1. Field of Invention

This invention relates to a monitor visor, especially relates to a monitor visor for fitting the monitor screen having round top corners.

2. Description of Related Arts

The environmental light projected on a screen of a personal computer will affect the visualization of the user and the color shown on the screen, so that the user may have the illusion of the incorrectly display on the screen. Using the visor for a personal or portable computer can effectively prevent the interference of the environmental light and the diffused light on the screen. However, there has no generalized universal computer cover or visor for incorporating with most of the current portable computer screens. In particular, there is no existing monitor visor designed for the monitor (e.g. "Apple-Mac" monitor) having round top corners or other non-rectangular shaped monitors.

SUMMARY OF THE PRESENT INVENTION

An object of the present invention is to provide a monitor visor, which is adapted for incorporating with a monitor screen with round top corners to other non-rectangular shaped monitors.

Accordingly, in order to accomplish the above object, the present invention provides a monitor visor which comprises a top component and two side components respectively formed at two sides of the top component, wherein the top component and the two side components are formed in a sheet-like configuration. The three components are orderly connected to form a visor body having a visor cavity with a top closing wall, two side closing walls, and a bottom opening. The sizes of the top closing wall and the side closing walls of the visor cavity match with the sizes of the top edge and two side edges of the monitor respectively. At least a connecting component is provided between the top component and at least one of the side components, wherein the connecting component joins the top component and the side component together. The shape of the inner side of the connecting component matches the shape of the vertex angle of the monitor.

The advantage of the present invention is that the connecting component is provided between the top component and the side components, wherein the contour of the inner side of the connecting component matches the shape of the vertex angle of the monitor, such that the monitor visor of the present invention can fit and incorporate with the monitor with top round corner or other vertex angles of the top corners. It can match different monitors by using different connecting components without changing the whole visor.

According to the present invention, the monitor visor can be further modified as follows.

Accordingly, the connecting components are individually formed between the top component and the two side components.

Furthermore, the monitor visor further comprises a retention component provided at the visor body to retain the visor body at the monitor in position.

Furthermore, the first type of the retention component comprises:

a plurality of location elements provided at the top component and two side components respectively, wherein each of the location elements has an engaging portion protruded out of the inner surface of the respective top and side components, wherein the height of the engaging portion of each of the location elements matches with the width of the rim of the monitor, wherein when the monitor is supported within the visor cavity of the visor body, the location element at the top component substantially contacts at the top rim of the monitor at the rear side thereof while the location elements at the side components substantially contact at the left and right rims of the monitor at the front side thereof respectively so as to substantially retain the visor body in position with respect to the monitor.

The first alternative mode of the first type of the retention component comprises:

two location elements provided at the two side components respectively, wherein the engaging portions of the location elements are protruded out of the inner surface of the side components, wherein the height of the engaging portion of each of the location elements matches the width of the rim of the monitor, when the monitor is supported within the visor cavity of the visor body, the engaging portions of the location elements at the side components substantially contact at the left and right rims of the monitor at the front and back sides thereof respectively, so as to substantially retain the visor body in position with respect to the monitor.

The second alternative mode of the first type of the retention component comprises:

two location elements spacedly provided at the top component, wherein the engaging portions of the location elements are protruded out of the inner surface of the top components, wherein the height of the engaging portion of each of the location elements matches the width of the rim of the monitor, when the monitor is supported within the visor cavity of the visor body, the engaging portions of the location elements at the top component substantially contact at the top rim of the monitor at the front and back sides thereof respectively, so as to substantially retain the visor body in position with respect to the monitor.

The second type of the retention component comprises:

a plurality of sliding arrangements provided at the two side components respectively, wherein each of the sliding arrangements comprises a sliding slot provided at the respective side component and a sliding element slidably coupled along the sliding slot, wherein each of the sliding element has a coupling end adjustably engaging with the side rim of the monitor to substantially retain the visor body in position with respect to the monitor.

The first alternative mode of the second type of the retention component comprises:

a plurality of sliding arrangements provided at the two side components respectively, wherein each of the sliding arrangements comprises a sliding slot provided at the respective side component, and a sliding element having an upper end slidably coupled along the sliding slot and a lower end extending out of the sliding slot to adjustably couple with the side rim of the monitor so as to substantially retain the visor body in position with respect to the monitor.

The second alternative mode of the second type of the retention component comprises:

a sliding arrangement provided at the top component, wherein the sliding arrangements comprises a sliding slot provided at the top component, and a sliding element having one end slidably coupled along the sliding slot and an opposed end extending out of the sliding slot to adjustably couple with the top rim of the monitor so as to substantially retain the visor body in position with respect to the monitor.

The third alternative mode of the second type of the retention component comprises:

a sliding arrangement provided at the top component, wherein the sliding arrangement comprises a sliding slot provided at the top component, and a sliding element having an upper end slidably coupled along the sliding slot and a lower end extending out of the sliding slot to adjustably couple with the top rim of the monitor so as to substantially retain the visor body in position with respect to the monitor.

Using the location element, the visor body can be securely held at the monitor to prevent any unwanted sliding movement of the visor body.

Furthermore, the connecting component for coupling the top component with the side components comprises two coupling grooves formed at two side ends of the connecting component, wherein each end portion of the top component is detachably coupled with one of the coupling grooves of the connecting component while the end portion of the side component is detachably coupled with another coupling groove of the connecting component so as to detachably couple the top component with the respective side component.

The advantage of using the above mentioned structure of the connecting component is that when the top and side components are coupled at the coupling grooves of the connecting component respectively, the visor body can be easily and securely assembled and dissembled.

Furthermore, at least one of the side components has at least one communication slot arranged in such a manner that when the visor body is held with the monitor, the communication slot is aligned with the connection port of the monitor, wherein the connection port can be the optical connection port, monitor adjusting buttons, and/or the periphery accessory interface located at the side rim of the monitor. Accordingly, the communication slot is a through slot having the shape and size matching with the connection port of the monitor.

Alternatively, at least one of the side components has at least one accessing notch formed at a rear edge thereof and arranged in such a manner that when the visor body is held with the monitor, the accessing notch is aligned with the connection port of the monitor, wherein the connection port can be the optical connection port, monitor adjusting buttons, and/or the periphery accessory interface located at the side rim of the monitor. Accordingly, the accessing notch is an indention of the side component and has the shape and size matching with the connection port of the monitor.

The advantage of having the communication slot or the accessing notch at the side component is that the user is able to access the connection port of the monitor to connect with the external device without removing the visor body from the monitor.

The visor can be made of various materials to provide different functions. Accordingly, the visor can be made of bamboo charcoal adapted for adsorbing toxic gases and electromagnetic radiation, biodegradable plastic, high-strength carbon, woven carbon fiber, applied-nanotechnology materials, aluminum-magnesium alloy and other light metal alloys, thin iron material after rust prevention treatment, stainless steel, magnetic medium wave absorbing material, dielectric polymer composite wave absorbing material, other electromagnetic radiation absorbable materials, plastic materials, starch, natural bamboo, bamboo fiber composite material, animal fur products, paper products, or aluminum composite material.

The visor described in the embodiments can be made by using the following processes: injection molding, sewing, paste, carving, stamping, die-casting, cutting, silkscreen printing.

These and other objectives, features, and advantages of the present invention will become apparent from the following detailed description, the accompanying drawings, and the appended claims.

DETAILED DESCRIPTION OF THE PREFERRED EMBODIMENT

The principle and features of the present invention are described below with reference to the accompanying drawings. The described embodiments is only used to explain the present invention and not intended to limit the scope of the present invention.

Embodiment 1

Figure 1:
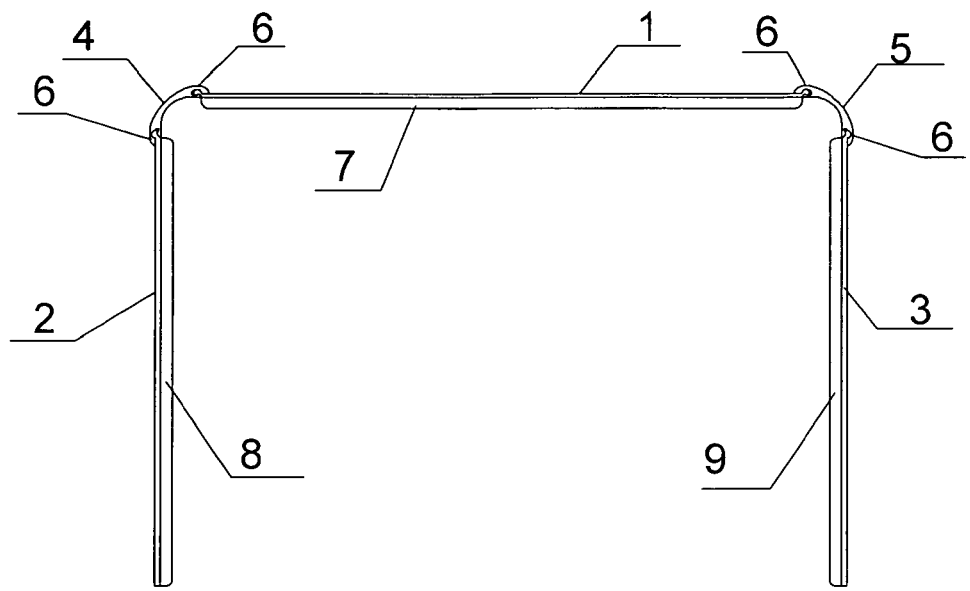
FIG. 1 is a front view of a monitor visor according to a first preferred embodiment of the present invention.

As shown in FIG. 1, according to the first embodiment of the present invention, the visor consists of a top component 1, and two side components which are a left side component 2 and a right side component 3. The top component 1 is coupled to the two side components (i.e. the left side component 2 and the right side component 3) to form the visor body having a visor cavity and defining a top closing wall, two side closing walls and a bottom opening that the monitor 100 is received within the visor cavity. The shape and size of the visor body matches the shape of the monitor 100 that the top closing wall matches with the top rim 101 of the monitor 100 while the two side closing walls match with the two side rims 102, i.e. the left and right rims, of the monitor 100 respectively. The top component 1 and the two side components 2, 3 are detachably coupled with each other via two connecting components 4, 5. Each of the connecting components 4, 5 has an arc-shaped inner surface matching with a curvature of the vertex angle of the monitor, i.e. the top round corners 103 of the monitor 100.

The monitor visor further comprises two side location elements 8, 9 provided at inner surfaces of the left and right side components 2, 3 respectively, and a top location element 7 provided at an inner surface of the top component 1. Each of the top and side location elements 7, 8, 9, has an engaging portion protruded from the inner surface of the respective top and side component 1, 2, 3. Preferably, the engaging portions of the top and side location elements 7, 8, 9 are perpendicularly extended from the inner surfaces of the top and side components 1, 2, 3 respectively. The height of the engaging portion of each of the location elements 7, 8, 9 matches with the width of the top and side rims 101, 102 of the monitor 100, wherein when the monitor 100 is supported within the visor cavity of the visor body, the top location element 7 at the top component 1 substantially contacts at the top rim 101 of the monitor 100 at the rear side thereof while the side location elements 8, 9 at the side components 2, 3 substantially contact at the left and right rims 102 of the monitor 100 at the front side thereof respectively so as to substantially retain the visor body in position with respect to the monitor 100 via the location elements 7, 8, 9.

Figure 2:
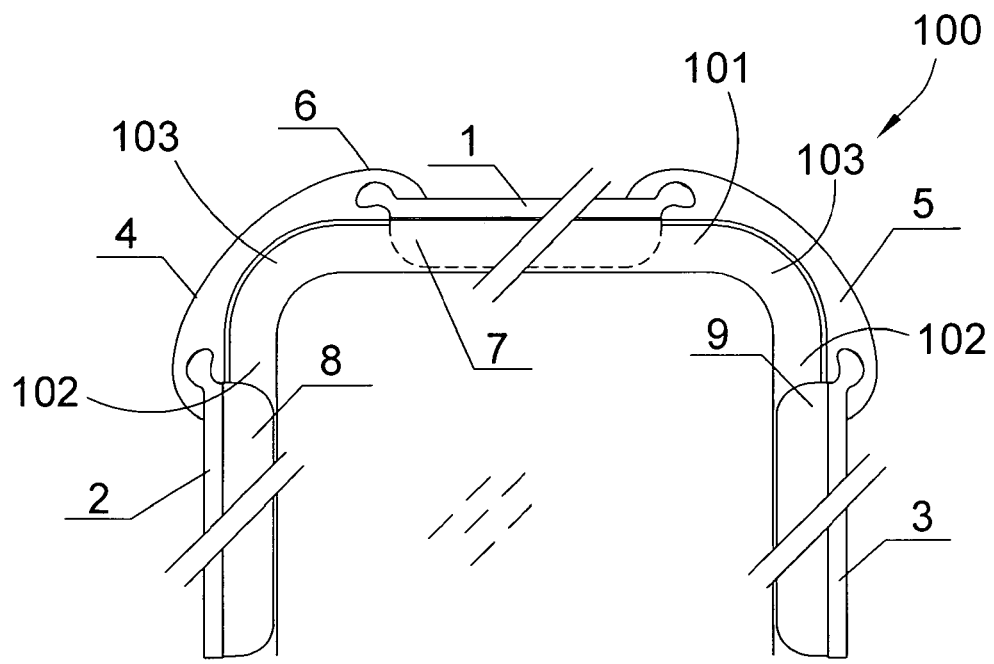
FIG. 2 is a partial enlarged sectional view of the monitor visor according to the above first embodiment of the present invention.

FIG. 2 is a partially enlarged view of the first embodiment according to the present invention. As shown in FIG. 2, each of the connecting components 4, 5 has a connecting unit 6 to detachably couple with the top component 1, the left side component 2, and the right side component 3. In particular, the connecting component 4 is detachably coupled with the top component 1 and the left side component 2 while the connecting component 5 is detachably coupled with the top component 1 and the right side component 3. Each of the connecting component 4, 5 has a curved inner surface having a curvature matching with the corresponding top round corner 103 of the monitor 100. Accordingly, the connecting unit 6, which is formed a tongue-groove configuration, comprises two coupling grooves formed at two side ends of the connecting component 4, 5, wherein each of the coupling grooves has a size and shape matching with the end portion of the top component 1 and the end portion of each of the side components 2, 3. Therefore, the two end portions of the top component 1 and the top end portions of the side components 2, 3 form the protruding engaging portions to slidably engage with the coupling grooves respectively. In other words, the connecting component 4 is detachably coupled between the top component 1 and the left side component 2 by slidably coupling the end portion of the top component 1 and the end portion of the left side component 2 with the coupling grooves of the connecting component 4. Likewise, the connecting component 5 is detachably coupled between the top component 1 and the right side component 3 by slidably coupling the end portion of the top component 1 and the end portion of the right side component 3 with the coupling grooves of the connecting component 5. Alternatively, the connecting unit 6 can be embodied as glue element that the connecting components 4, 5 can be coupled with the top component 1, the left side component 2, and the right side component 3 via adhesive.

The curved inner surface of the connecting component 4 can match the monitor 100 with circular vertex angle. The connecting component 4 with different shapes can be interchanged to match the monitors with different shaped vertex angles. And the top component 1, the left side component 2, the right side component 3, and the connecting component 4 are all individual components for being disassembled, conveniently transported and manufactured.

Figure 3:
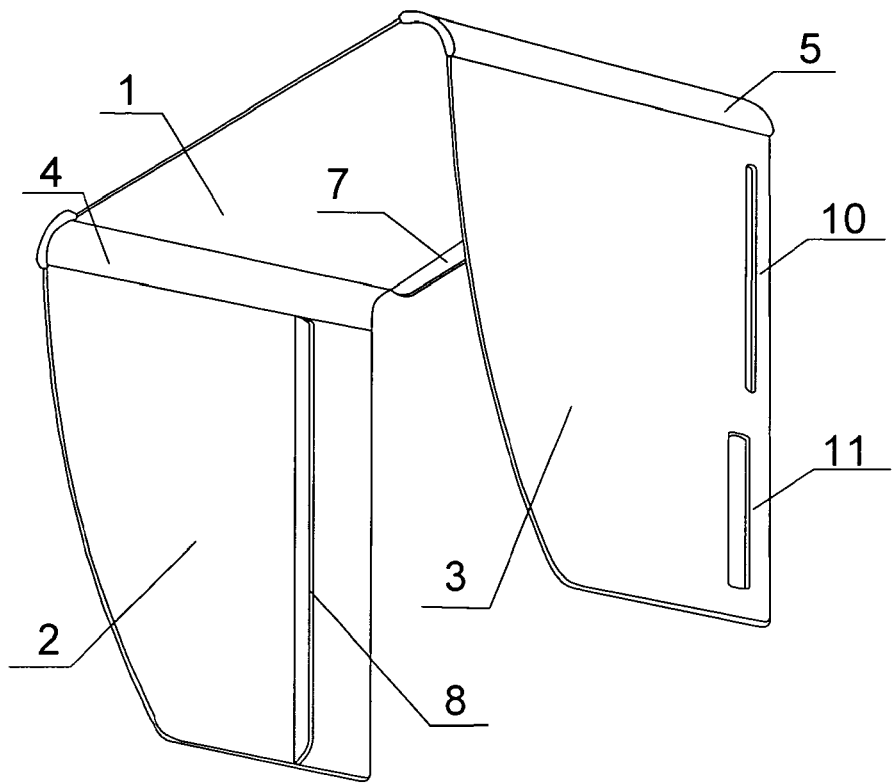
FIG. 3 is a perspective view of the monitor visor according to the above first embodiment of the present invention.

FIG. 3 is a perspective view of the first embodiment of the present invention. As shown in FIG. 3, when the monitor visor is held to encircle with the monitor 100, the location element 7 is positioned at the top rim 101 of the monitor 100 at the rear side thereof, the location element 9 is positioned at the right-side rim 102 of the monitor 100 at the front side thereof, and the location element 8 is positioned at the left-side rim 102 of the monitor 100 at the front side thereof. The three location elements 7, 8, 9 can retain the visor with respect to the monitor 100. There are two communication slot 10, 11 is formed at the left side component 3 to let users conveniently use the sockets at the side of the monitor 100.

Figure 4:
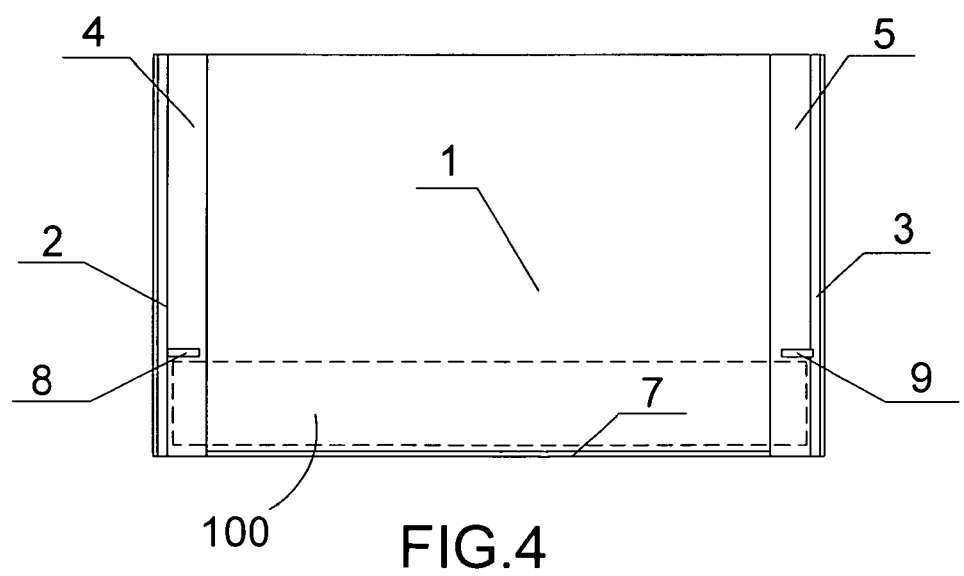
FIG. 4 is a bottom view of the monitor visor according to the above first embodiment of the present invention.

FIG. 4 is a bottom view of the first embodiment of the present invention. FIG. 4 illustrates the relative position among the location elements 7, 8, 9.

The inner surface of the connecting component 4 can be right-angle or other shapes to match the monitor screen with a right angle or other shapes of its vertex angle. Furthermore, there can be only one connecting component 4 between the top component 1 and one of the side components to be adapted to a monitor screen with only one special shape angle.

Embodiment 2

Figure 5:
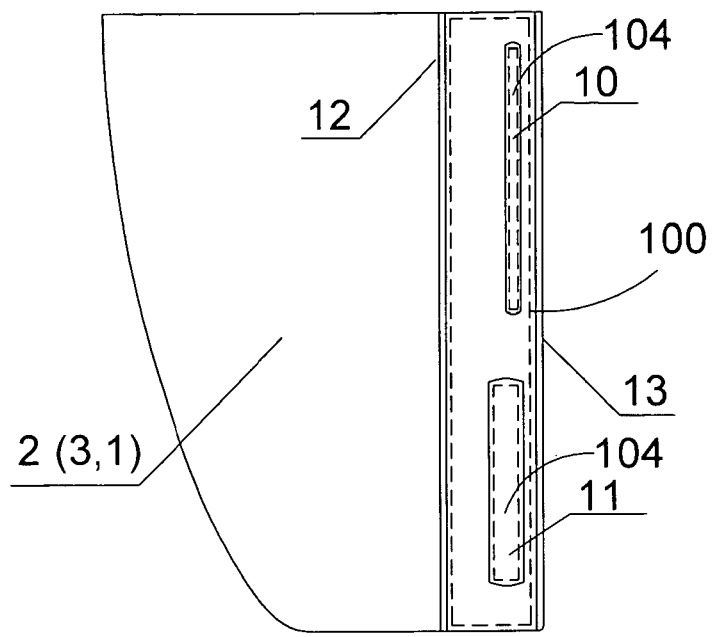
FIG. 5 is a side view of the monitor visor according to a second preferred embodiment of the present invention, illustrating the side component of the present invention.

The second embodiment of the present invention is shown in FIG. 5 to illustrate the alternative mode of the first embodiment. In the second embodiment, the structure of the second embodiment is same as the first embodiment except the structure of the retention components. According to the second embodiment, each of the top and side components 1, 2, 3 has two location elements 12, 13 extending parallelly. Each of the location elements 12, 13 has an engaging portion protruded out of the inner surface of the respective top and side components 1, 2, 3, wherein the height of the engaging portion of each of the location elements 12, 13 matches with the width of the top rim 101 of the monitor 100.

When the monitor 100 is supported within the visor cavity of the visor body, the location elements 12, 13 at the top component 1 substantially contact at the top rim 101 of the monitor 100 at the front and rear sides thereof such that the top rim 101 of the monitor 100 is fittingly located between the location elements 12, 13 at the top component 1. The location elements 12, 13 at the side components 2, 3 substantially contact at the side rims 102 of the monitor 100 at the front and rear sides thereof such that the side rims 102 of the monitor 100 is fittingly located between the location elements 12, 13 at the side components 2, 3 respectively, so as to substantially retain the visor body in position with respect to the monitor 100. It is worth mentioning that the location elements 12, 13 can be formed at the top component 1 only or the location elements 12, 13 can be formed at the side components 2, 3 only to retain the visor body in position with respect to the monitor 100.

Embodiment 3

Figure 6:
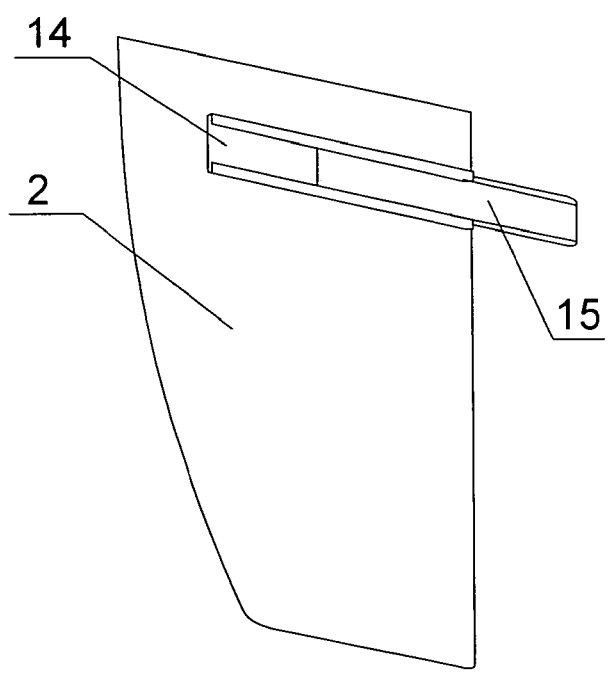
FIG. 6 is a perspective view of the side component of the monitor visor according to a third preferred embodiment of the present invention, illustrating the sliding arrangement at the side component.

The third embodiment of the present invention is shown in FIG. 6 to illustrate an alternative mode of the first and second embodiments. In the third embodiment, the structure of the third embodiment is same as the structures of the first and second embodiments except the structure of the retention component. According to the third embodiment, the retention component comprises a plurality of sliding arrangements provided at the top and side components 1, 2, 3 respectively, wherein each of the sliding arrangements comprises a sliding slot 14 provided at each of the top and side components 1, 2, 3 at the inner surface thereof and a sliding element 15 slidably coupled along the sliding slot 14. Each of the sliding elements 15 has a sliding end slidably coupled with the respective sliding slot 14 and a coupling end adjustably engaging with the side rim 102 of the monitor 100 preferably by adhesive to substantially retain the visor body in position with respect to the monitor 100. In other words, the sliding elements 15 at the top component 1 are slidably adjusted to couple the coupling ends of the sliding elements 15 at the top rim 101 of the monitor 100 at the front and rear sides thereof respectively. The sliding elements 15 at the side components 2, 3 are slidably adjusted to couple the coupling ends of the sliding elements 15 at the side rims 102 of the monitor 100 respectively. Therefore, the visor body can be securely retained in position to enclose the monitor 100 therewithin.

According to the third embodiment, the sliding arrangement can provided at the top component 1 only or at the side components 2, 3 only. Alternatively, the sliding element 15 has an upper end slidably coupled along the sliding slot 14 and a lower end extending out of the sliding slot 14 to adjustably couple with the side rim 102 of the monitor 100 so as to substantially retain the visor body in position with respect to the monitor 100.

Embodiment 4

Figure 7:
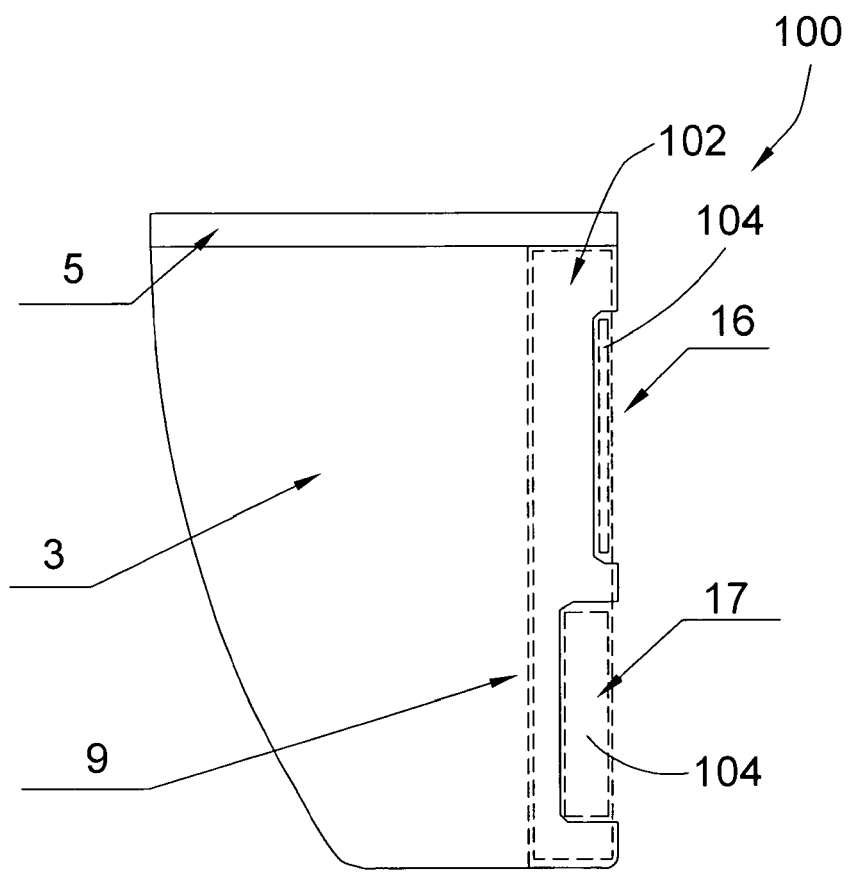
FIG. 7 is a side view of the side component of the monitor visor according to a fourth preferred embodiment of the present invention.

The fourth embodiment of the present invention is shown in FIG. 7 to illustrate another alternative mode of the first embodiment. According to the fourth embodiment, the structure of the fourth embodiment is same as the structure of the first embodiment except the structure of the communication slot at the two side components. FIG. 7 is a right view of the right side component 3. The right side component 3 has two accessing notches 16, 17 spacedly indented at the rear edge thereof, wherein each of the accessing notches 16, 17 is located with respect to the connection port 104 of the monitor 100. When the visor body is held with the monitor 100, the accessing notches 16, 17 are aligned with the connection ports 104 of the monitor 100 respectively, wherein the connection port 104 can be the optical connection port, monitor adjusting buttons, and/or the periphery accessory interface located at the side rim 102 of the monitor 100. Accordingly, the accessing notch 16, 17 is an indention of the side component and has the shape and size matching with the connection port 104 of the monitor 100.

One skilled in the art will understand that the embodiment of the present invention as shown in the drawings and described above is exemplary only and not intended to be limiting. It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A monitor visor for a monitor having two round top corners, comprising:
    a top component;
    two side components respectively formed at two sides of the top component, wherein said top component and said two side components are formed in a sheet-like configuration and are orderly connected to form a visor body having a visor cavity with a top closing wall, two side closing walls, and a bottom opening for enclosing said monitor;
    connecting means for detachably joining said top component with said side components, wherein said connecting means comprises two connecting components forming two top corners of said visor body respectively, wherein each of said connecting components has an arc-shaped inner surface for matching with said round top corner of said monitor; and
    a retaining component for retaining said visor body at said monitor in position, wherein said retaining component comprises a top location element protruded at an inner surface of said top component, and two side location elements protruded at inner surfaces of said side components respectively, wherein each of said top and side location elements has an engaging portion protruded at said inner surfaces of said top and side components respectively, wherein a height of each of said engaging portions matches with a width of top and side rims of said monitor, wherein said top location element is arranged for contacting with said top rim of said monitor at a rear side thereof, wherein said side location elements are arranged for contacting with said side rims of said monitor at a front side thereof so as to substantially support and retain said visor body in position with respect to said monitor.

2. The monitor visor, as recited in claim 1, wherein each of said connecting components has two coupling grooves provided at two side ends thereof respectively, wherein one of said coupling grooves is detachably coupled with an end portion of said top component and another coupling groove is detachably coupled with an end portion of one of said side components, such that said connecting components are detachably coupled with said top and side components in a tongue-groove configuration in order to form said visor body.

3. The monitor visor, as recited in claim 2, wherein at least one of said side components has at least one communication slot arranged in such a manner that when said visor body is held with the monitor, said communication slot is aligned with a connection port of said monitor, wherein said connection port is one of optical connection port, monitor adjusting buttons, and a periphery accessory interface located at a side rim of said monitor, wherein said communication slot is a through slot for aligning with said connection port of said monitor.

4. A monitor visor for a monitor having two round top corners, comprising:
    a top component;
    two side components respectively formed at two sides of the top component, wherein said top component and said two side components are formed in a sheet-like configuration and are orderly connected to form a visor body having a visor cavity with a top closing wall, two side closing walls, and a bottom opening for enclosing said monitor;
    connecting means for detachably joining said top component with said side components, wherein said connecting means comprises two connecting components forming two top corners of said visor body respectively, wherein each of said connecting components has an arc-shaped inner surface for matching with said round top corner of said monitor; and
    a retaining component for retaining said visor body at said monitor in position, wherein said retaining component comprises two side location elements provided at inner surfaces of said two side components respectively, wherein each of said location elements has an engaging portion protruded at said inner surface of the side component, wherein a height of each of said engaging portions matches a width of a side rim of said monitor, wherein said side location elements are arranged for contacting with said side rims of said monitor at front and rear sides thereof respectively so as to substantially support and retain said visor body in position with respect to said monitor.

5. The monitor visor, as recited in claim 4, wherein each of said connecting components has two coupling grooves provided at two side ends thereof respectively, wherein one of said coupling grooves is detachably coupled with an end portion of said top component and another coupling groove is detachably coupled with an end portion of one of said side components, such that said connecting components are detachably coupled with said top and side components in a tongue-groove configuration in order to form said visor body.

6. The monitor visor, as recited in claim 5, wherein at least one of said side components has at least one communication slot arranged in such a manner that when said visor body is held with the monitor, said communication slot is aligned with a connection port of said monitor, wherein said connection port is one of optical connection port, monitor adjusting buttons, and a periphery accessory interface located at a side rim of said monitor, wherein said communication slot is a through slot for aligning with said connection port of said monitor.

7. A monitor visor for a monitor having two round top corners, comprising:
   a top component;
   two side components respectively formed at two sides of the top component, wherein said top component and said two side components are formed in a sheet-like configuration and are orderly connected to form a visor body having a visor cavity with a top closing wall, two side closing walls, and a bottom opening for enclosing said monitor;
   connecting means for detachably joining said top component with said side components, wherein said connecting means comprises two connecting components forming two top corners of said visor body respectively, wherein each of said connecting components has an arc-shaped inner surface for matching with said round top corner of said monitor; and
   a retaining component for retaining said visor body at said monitor in position, wherein said retaining component comprises two location elements spacedly provided at an inner surface of said top component, wherein each of said location elements has an engaging portion protruded at said inner surface of said top components, wherein a height of said engaging portion matches a width of a top rim of the monitor, wherein said location elements are arranged for contacting with said top rim of said monitor at front and rear sides thereof respectively so as to substantially support and retain said visor body in position with respect to said monitor.

8. The monitor visor, as recited in claim 7, wherein each of said connecting components has two coupling grooves provided at two side ends thereof respectively, wherein one of said coupling grooves is detachably coupled with an end portion of said top component and another coupling groove is detachably coupled with an end portion of one of said side components, such that said connecting components are detachably coupled with said top and side components in a tongue-groove configuration in order to form said visor body.

9. The monitor visor, as recited in claim 8, wherein at least one of said side components has at least one communication slot arranged in such a manner that when said visor body is held with the monitor, said communication slot is aligned with a connection port of said monitor, wherein said connection port is one of optical connection port, monitor adjusting buttons, and a periphery accessory interface located at a side rim of said monitor, wherein said communication slot is a through slot for aligning with said connection port of said monitor.

* * * * *